US008132316B1

(12) United States Patent
Rankin et al.

(10) Patent No.: US 8,132,316 B1
(45) Date of Patent: Mar. 13, 2012

(54) HANDHELD MICROPROCESSOR CONTROLLED PNEUMATIC TAPPET SETTING SYSTEM

(75) Inventors: Brent Rankin, Lima, OH (US); Marc McDaniel, Botkins, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1024 days.

(21) Appl. No.: 12/053,916

(22) Filed: Mar. 24, 2008

(51) Int. Cl.
*B23P 21/00* (2006.01)
*B23Q 17/00* (2006.01)
*F01L 1/14* (2006.01)
*F01L 1/20* (2006.01)

(52) U.S. Cl. ........... 29/709; 29/714; 29/284; 29/407.03; 29/407.05; 29/407.09; 29/407.1; 123/90.48; 123/90.52

(58) Field of Classification Search ............... 29/407.01, 29/407.03, 407.05, 407.09, 407.1, 709, 714, 29/270, 284; 123/90.43, 90.45, 90.48, 90.52, 123/90.53; 700/95, 108, 117
See application file for complete search history.

(56) References Cited

U.S. PATENT DOCUMENTS

| | | | | |
|---|---|---|---|---|
| 6,205,850 | B1 * | 3/2001 | Wehrman et al. | 73/114.79 |
| 6,450,072 | B1 | 9/2002 | Koester | |
| 6,546,347 | B2 | 4/2003 | Batchelor et al. | |
| 6,973,905 | B2 | 12/2005 | Hathaway et al. | |
| 7,114,230 | B2 | 10/2006 | Batchelor et al. | |
| 7,207,301 | B2 | 4/2007 | Hathaway et al. | |
| 2006/0288973 | A1 | 12/2006 | Hathaway | |
| 2008/0022956 | A1 * | 1/2008 | Matsuura et al. | 123/90.54 |

* cited by examiner

*Primary Examiner* — Jermie Cozart
(74) *Attorney, Agent, or Firm* — Rankin Hill & Clark LLP

(57) ABSTRACT

A tappet clearance setting apparatus includes a screwdriver, a pneumatic portion, and a controller. The screwdriver engages the tappet screw and the pneumatic portion provides a monitored and air flow through an engine cylinder. The controller directs the screwdriver to tighten the tappet until the air flow through the cylinder is indicative of a valve opening. The controller then directs the screwdriver to reverse directions until the sensed air flow indicates that the valve has closed, which further indicates that the tappet screw is in a reference position. From the reference position, the controller directs the screwdriver to loosen the tappet a predetermined amount to establish the desired tappet clearance.

14 Claims, 5 Drawing Sheets

HANDHELD MICROPROCESSOR CONTROLLED PNEUMATIC TAPPET SETTING SYSTEM

BACKGROUND OF THE INVENTION

1. Field of the Invention

The present invention is generally directed toward manufacturing methods and, more particularly, toward a method and device for reliably setting a tappet clearance.

2. Description of the Related Art

Tappet clearance is the distance between a bottom surface of an adjustment or tappet screw and an upper surface of a valve. Accurately setting the tappet clearance, which is vital to proper operation of the engine, is time-consuming and labor-intensive.

Various methods and devices for manually adjusting tappet screws are known in the art. In accordance with one conventional method, the crankshaft or cam is put in the proper angular orientation, and feeler gauges are inserted between the tappet screw and the valve stem. The tappet screw then is rotated until the screw engages the valve stem. Then a wrench is used to tighten the jam nut to hold the tappet screw in position. This manual method requires positioning the feeler gauge, adjusting the tappet screw and then tightening the nut without disturbing the position of the tappet screw. It is often difficult to accomplish all of the actions precisely and repeatably, and it is usually awkward to have all of the required tools in position simultaneously.

Further, various devices have been developed to facilitate setting tappet clearance. For example, the tool in U.S. Pat. No. 6,345,436 provides a member for rotating the screw toward or away from the valve, and means for limiting the force applied to the screw. U.S. Pat. No. 6,450,072 discloses a tool in which the tappet screw is adjusted by a hand-operated device that does not apply more than a predetermined torque limit, with a torque wrench which is used to loosen and tighten the jam nut. The proper amount of torque is achieved by the use of a clutch mechanism. This tool requires the operator to have the proper feel for the appropriate amount of torque. The operator may override the torque setting by exceeding the designated number of clicks produced by the clutch mechanism, by turning the tool too fast, or by applying excessive force to the handle. If the proper torque is not applied to the screw, the clearance will be set incorrectly. In addition, the tool requires a repetitive motion that has ergonomic deficiencies.

While these devices may operate generally satisfactorily, improvements to the process of setting tappet clearance is desired. Particularly, the known devices and methods rely upon user expertise to in order to properly set tappet clearance. As a result, the possibility of error with conventional devices is unreasonably high. Therefore, a need exists for an improved tool and method for setting tappet clearance that is less dependent on operator expertise.

SUMMARY OF THE INVENTION

The present invention provides a method and tool for setting tappet clearance. In accordance with the present invention, the tappet screw can be set to the desired clearance using a tool that is easy to handle and operate.

The tool of the present invention includes a power-driven screwdriver portion, a pneumatic portion, and a controller. The pneumatic portion introduces a controlled flow of air into the engine, and the controller monitors the air flow and controls operation of the screwdriver to rotate a tappet screw and thereby set the tappet clearance.

The method includes engaging the screwdriver to a tappet screw and inserting the pneumatic portion into a spark plug hole. The pneumatic portion introduces an air flow into the cylinder via the spark plug hole, the air flow being monitored by the pneumatic portion and a controller. The controller instructs the screwdriver to selectively tighten and loosen the tappet screw based on the monitored air flow through the cylinder so as to position the tappet screw in a reference position. Starting from the reference position, the controller instructs the screwdriver to rotate the tappet screw a predetermined number of degrees to set the desired tappet clearance.

In accordance with the present invention, upon initiation of the process, the controller monitors the air flow and detects a stabilization of the air flow. Once the air flow stabilizes, the controller instructs the screwdriver to tighten the tappet screw. Once the air flow increases, which is indicative of the valve opening, the controller instructs the screwdriver to reverse direction so as to loosen the tappet screw. Then, when the controller detects a stabilization of the air flow, indicative of the valve being closed, the controller stops the screwdriver, and instructs the screwdriver to rotate the tappet screw in a loosening direction a predetermined number of degrees to thereby set the tappet clearance.

In further accordance with the present invention, the air flow is monitored by a mass air flow meter that converts the detected air flow into a voltage proportional to the amount of air flow. The voltage is provided to the controller, and the controller directs a plurality of outputs to operate the screwdriver in response to the voltage.

BRIEF DESCRIPTION OF THE DRAWINGS

These and further features of the invention will be apparent with reference to the following description and drawings, wherein.

DETAILED DESCRIPTION OF THE INVENTION

The invention will now be described in accordance with its preferred embodiments. The description with reference to the figures is intended to simplify the explanation of the invention and is not meant to limit the scope of the invention.

Figure 1:
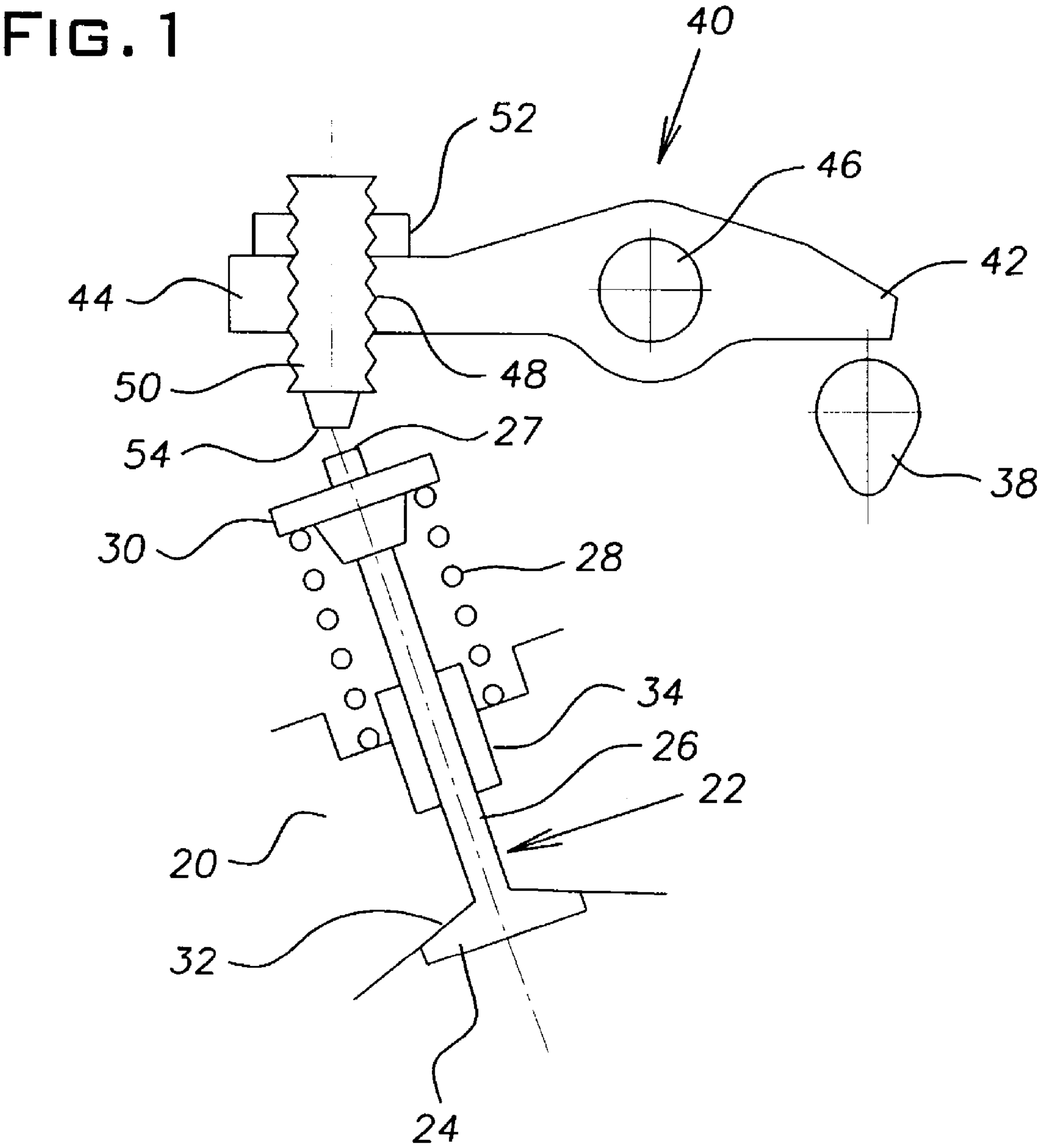
FIG. 1 schematically illustrates an engine valve actuation system.

With reference to FIG. 1, a valve actuation system is illustrated. An engine generally includes a cylinder block (not shown) on which a cylinder head 20 is mounted. The cylinder head 20 has a plurality of intake and exhaust valves 22 disposed therein. Each valve 22 includes a valve head 24, a valve stem 26, a valve spring 28, and a valve retainer 30. The valve head 24 is biased by the valve spring 28 toward a closed position in engagement with a seat 32 provided on the cylinder head 20. The valve stem 26 extends from the valve head 24 and through a valve guide 34 in the cylinder head 20. The valve retainer 30 is disposed on an end of the valve stem 26 opposite the valve head 24. The valve spring 28 surrounds the valve stem 26 and is captured between the valve retainer 30 and an outer surface of the cylinder head 20.

The cylinder head 20 also carries components that serve to controllably open and close the valves 22 in an ordered fashion. The components include a multi-lobe cam shaft 38 and a series of rocker arms 40, each rocker arm 40 being associated with one of the valves 22.

With continued reference to FIG. 1, each rocker arm 40, which includes a cam shaft end 42 and a valve end 44, is pivotally secured to a rocker arm shaft 46 that defines an axis of rocker arm rotation. The valve end 44 of the rocker arm 40 has a tapped hole 48 that threadably receives a tappet or adjustment screw 50. As the cam shaft 38 rotates, the rocker arm 40 pivots about its axis of rotation, and drives the tappet screw 50 into and out of engagement with the valve stem 26, thereby opening and closing the valve 22.

The tappet screw 50 has a tappet nut 52 thereon. After the tappet screw 50 is in a desired position or spacing relative to the valve stem 26, the tappet nut 52 is tightened to prevent unintended rotation of the tappet screw 50 relative to the rocker arm 40. Preferably, the tappet screw 50 has a very fine thread pitch to permit precise adjustment of the position of a lower end 54 of the tappet screw 50 and, hence, tappet clearance. Rotation of the tappet screw 50 varies the spacing between the lower or engagement end 54 of the tappet screw 50 and an upper or engaged surface 27 of the valve stem 26. Setting of the tappet clearance is one of the final steps in engine assembly, and is performed with the cylinder head 20 installed on the cylinder block.

Figure 2:
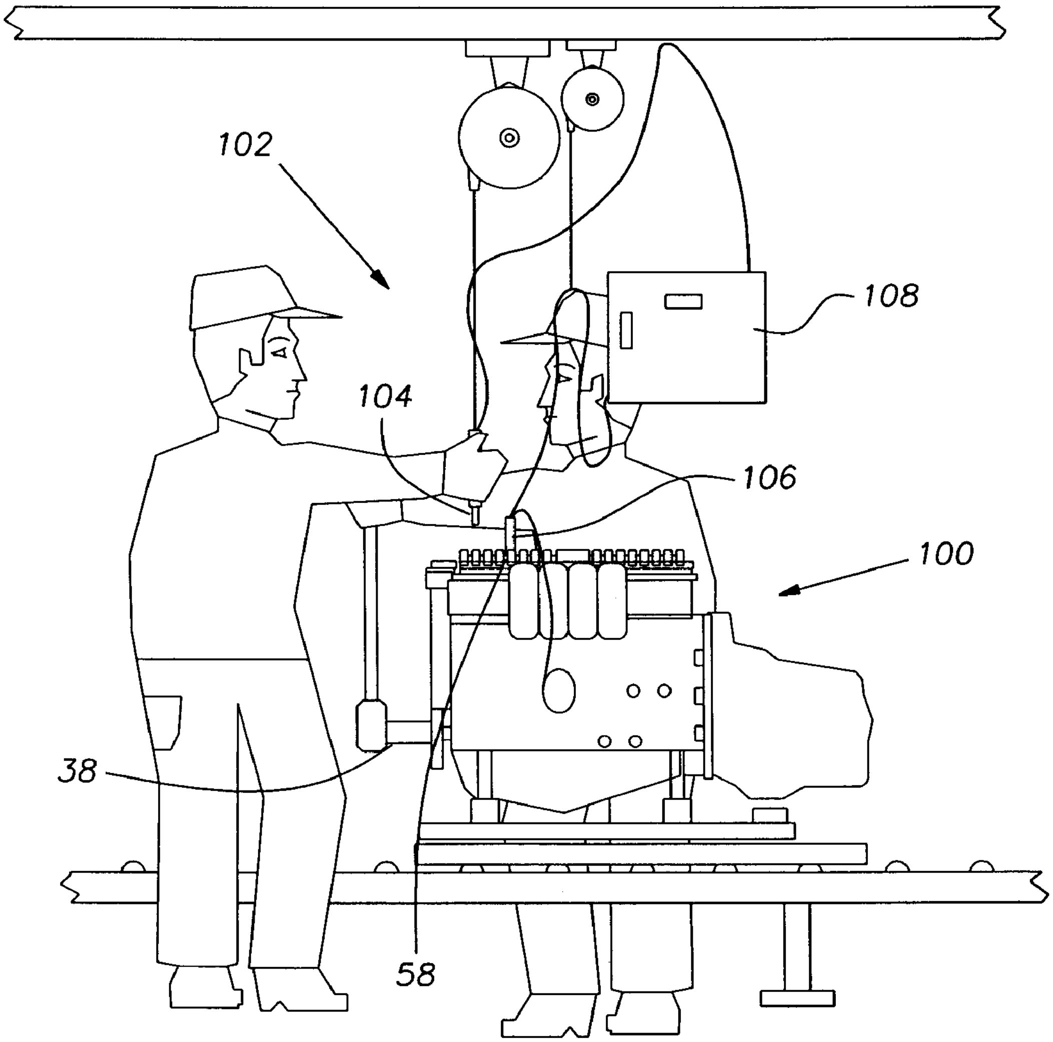
FIG. 2 illustrates a perspective view of a tappet clearance setting workstation.

With reference to FIG. 2, a workstation at which clearance of a tappet screw 50 is set by an operator is shown. An engine 100 moves into a tappet setting work area where the operator will set the tappet clearance. Upon entering the tappet setting work area, the engine's cam-shaft 38 is rotated to a predetermined position, leaving a number of valves in an ideal position for adjustment. Then, in accordance with the present invention, the operator utilizes a handheld microprocessor controlled pneumatic tappet setting device 102 (hereinafter, a "tappet setting device") to set the tappet clearance.

The tappet setting device 102 generally operates by moving the tappet screw 50 into a tappet reference point or position, and then rotating the tappet screw 50 a set number of degrees from the reference point or position so as to achieve the correct tappet clearance. The reference position, in the present embodiment, is defined as the tappet screw position at which the valve 22 is closed and the tappet screw 50 is in engagement with the valve stem 26 such that any tightening rotation of the tappet screw 50 will cause the valve 22 to open. According to the present invention, to reliably place the tappet screw 50 in the reference position, the tappet screw 50 is tightened to open the valve 22, and then loosened to close the valve 22. Whether the valve 22 is open or closed is determined pneumatically, as will be apparent from the following discussion.

Figure 3A:
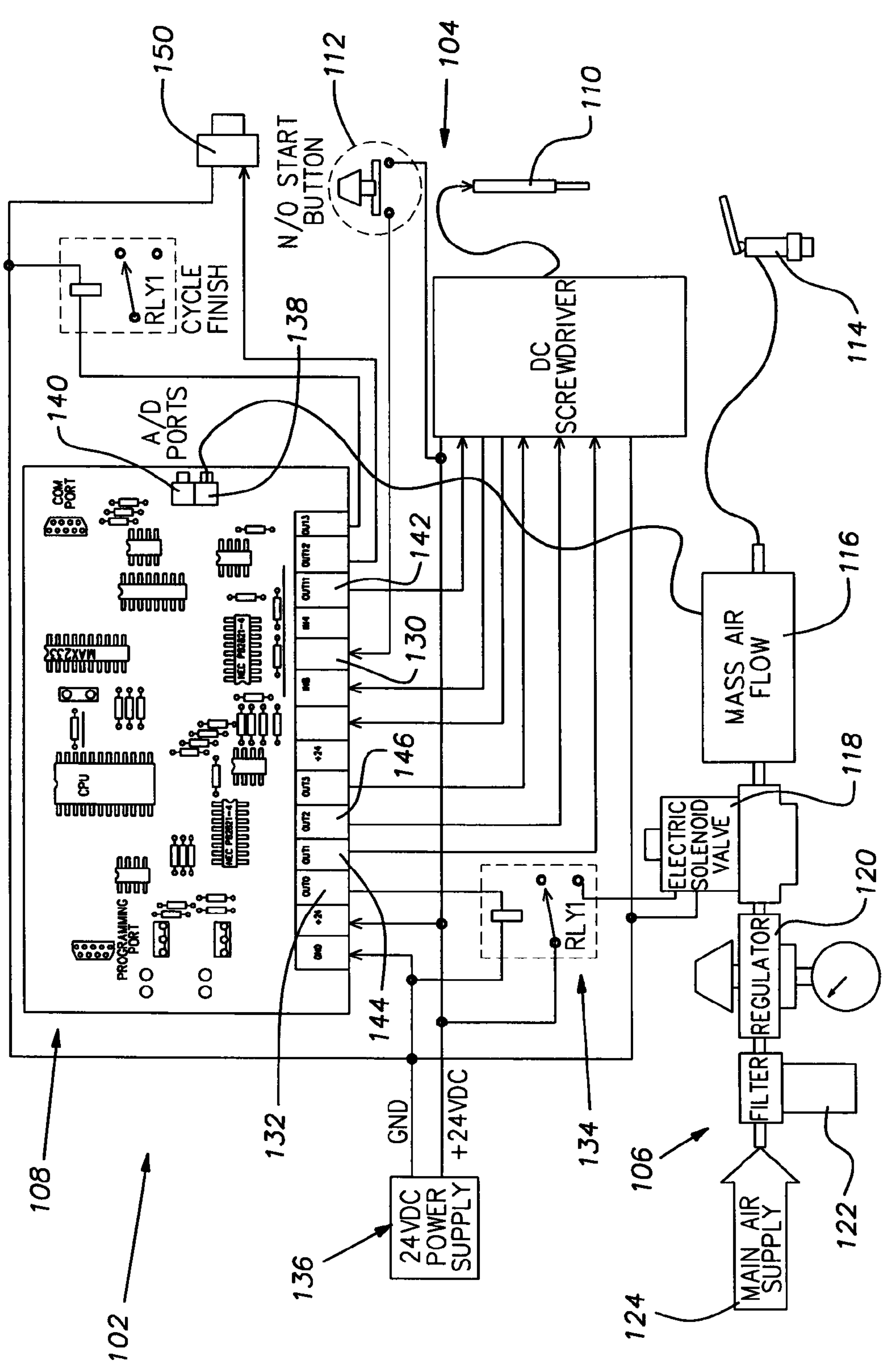
FIG. 3A schematically illustrates a tappet clearance setting device.

The tappet setting device 102, as shown in FIG. 3A, includes a microprocessor based control system 108 (hereinafter, a "controller"), the controller being connected to a pneumatic portion 106 and a screwdriver portion 104. The controller 108 receives signals from the screwdriver portion 104 and the pneumatic portion 106 so as to automatically set the tappet clearance.

With reference to FIG. 3A, the pneumatic portion 106 includes a pneumatic plug 114, a mass air flow meter 116, an electric solenoid valve 118, a regulator 120, a filter 122, and a main air supply 124. The main air supply 124 is in fluid communication with the regulator 120, with the filter 122 disposed therebetween, so as to provide filtered air to the regulator 120. The regulator 120 regulates air flow and pressure provided to the mass air flow meter 116. The electric solenoid valve 118 is disposed between the regulator 120 and the mass air flow meter 116, so as to selectively open and close a fluid communication channel between the regulator 120 and the mass air flow meter 116. The electric solenoid valve 118 is connected to and controlled by the controller 108, as will be described in further detail hereinafter.

The mass air flow meter 116 is connected to the pneumatic plug 114, which is, itself, inserted into the spark plug opening 58 by the operator. The mass air flow meter 116 generates a voltage proportional to the air flow sensed flowing therethrough, and outputs the voltage to the controller 108, as will be described in further detail hereinafter.

As shown in FIG. 3A, the screwdriver portion 104 includes a DC servomotor screwdriver 110 (hereinafter, "screwdriver") having a start button 112. The screwdriver 110 has a tip that engages and drives the tappet screw 50, with a DC servomotor for driving the tip. The start button 112, which is actuated by the operator to initiate a tappet clearance setting operation, is electrically connected to the controller 108. After the operator properly positions the screwdriver portion 104 and the pneumatic portion 106, the operator presses the start button 112 on the screwdriver portion 104 to begin the tappet clearance setting operation.

The controller 108, schematically illustrated in FIG. 3A, includes a process initiation portion 130, a solenoid output 132, a solenoid relay 134, a power supply source 136, a voltage input 138, a voltage monitor 140, a tightening output 142, a reverse output 144, and a reference output 146.

Figure 3B:
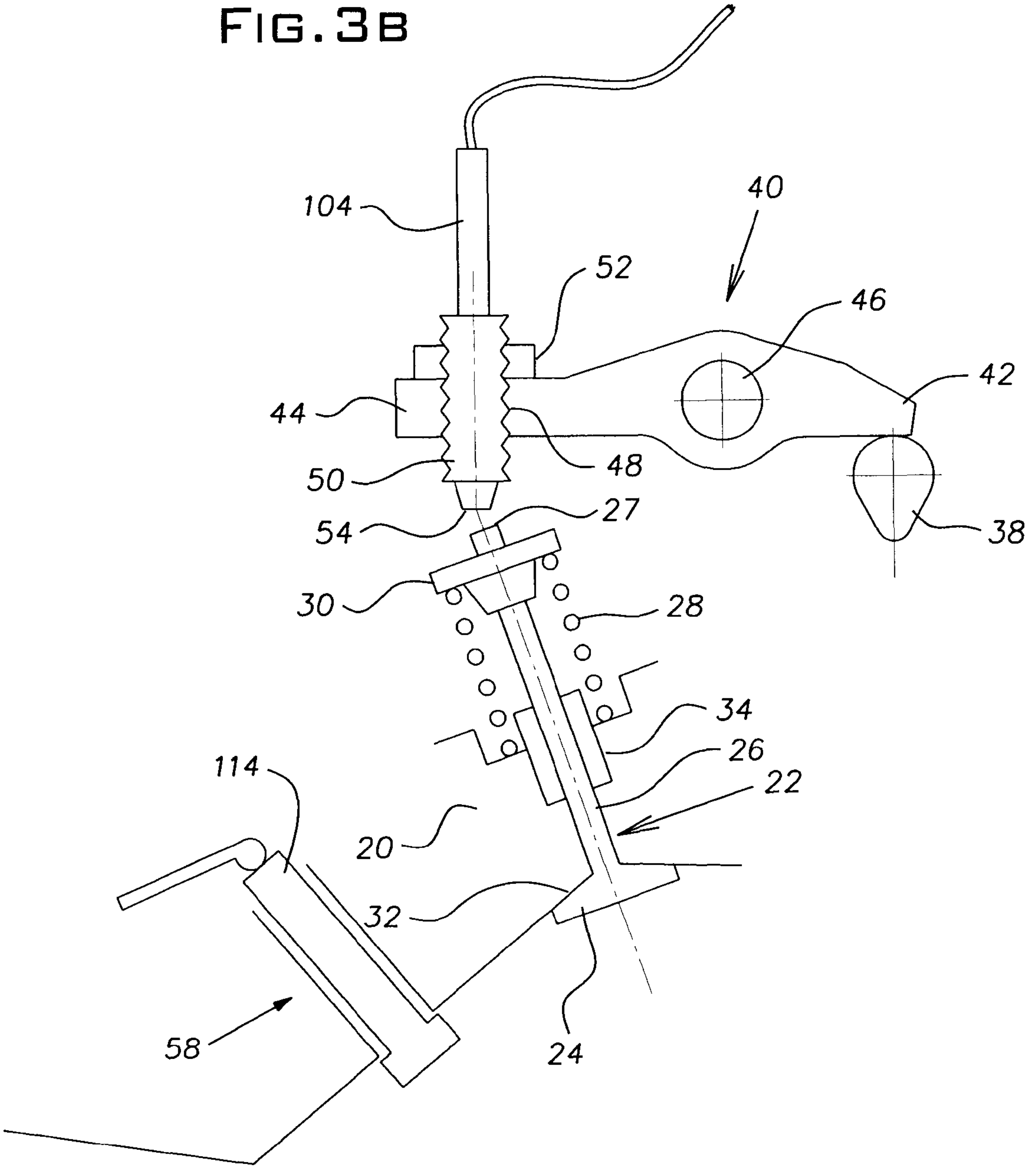
FIG. 3B schematically illustrates an engine valve actuation system with the tappet clearance setting device components engaged.
Figure 4:
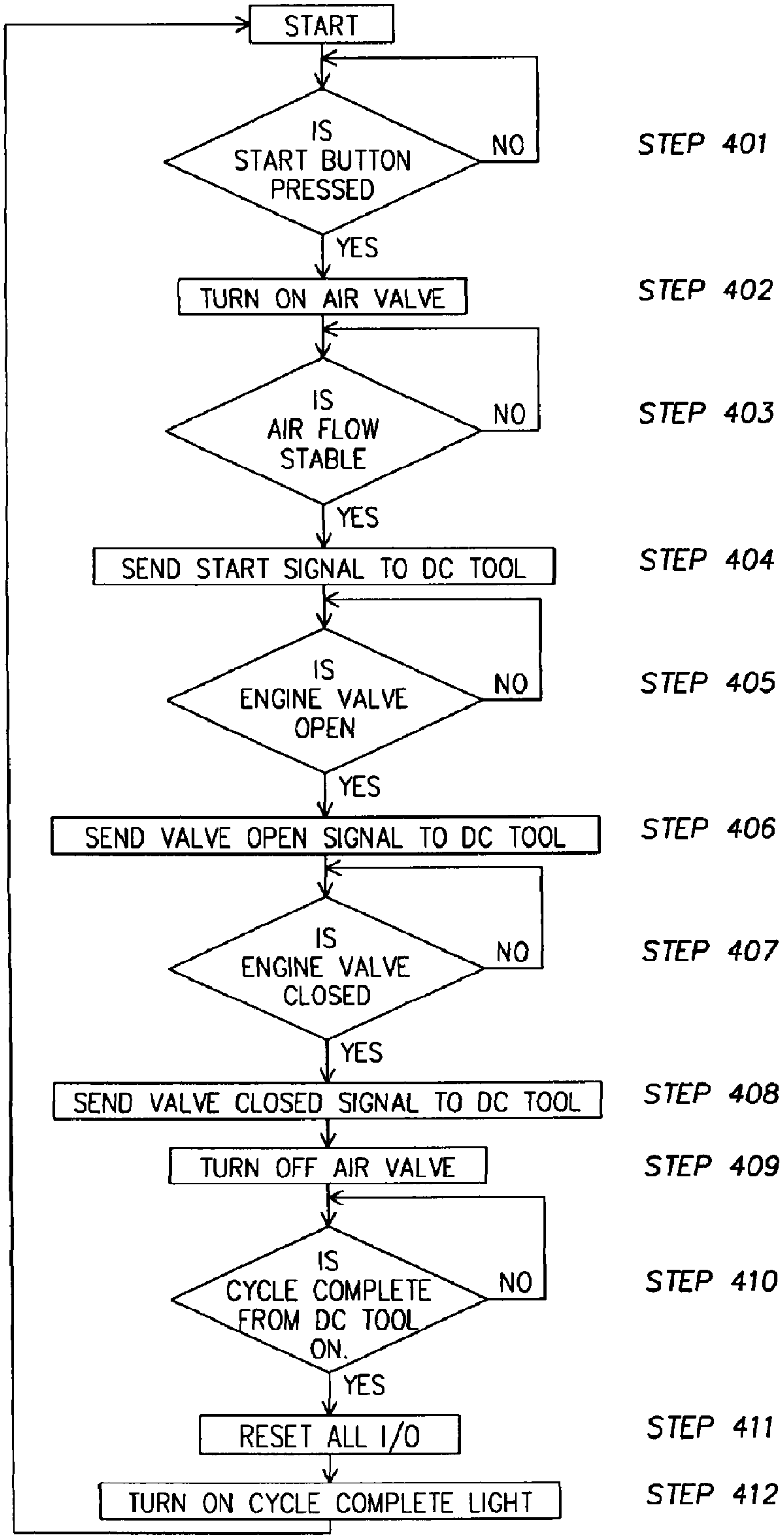
FIG. 4 is a flow chart of the process of setting the tappet clearance.

With reference to FIGS. 2 and 3B, the operator inserts the plug 114 of the pneumatic portion 106 into the spark plug hole 58 of the combustion chamber of the valve train tappets to be set. The operator also engages the screwdriver portion 104 with the tappet screw 50 to be adjusted. The screwdriver portion 104, once engaged with the tappet screw 50, can rotate the threadably received tappet screw 50 to cause linear movement of the tappet screw 50 relative to the valve 22, and thereby adjust the tappet clearance. The pneumatic portion 106 provides a regulated and monitored air flow through the engine combustion chamber, so as to be able to detect changes in the tappet clearance. The controller 108 receives an initiation signal from the screwdriver portion 104, and operational signals from the pneumatic portion 106, and thereby controls the operation of the pneumatic portion 106 and the screwdriver portion 104 so as to accurately set tappet clearance.

As mentioned above, the tappet clearance setting process begins when the screwdriver portion tip is engaged with the tappet screw 50, the pneumatic plug 114 is inserted in the spark plug opening 58, and the operator presses the start button 112. The process initiation portion 130 detects the pressing of the start button 112 (STEP 401). After the start button 112 has been pressed, the controller 108 begins the tappet clearance setting process by initiating the air flow (STEP 402).

The process initiation portion 130 receives the signal from the start button 112, and is electrically connected to the solenoid output 132. Through this electrical connection, the process initiation portion 130 sends a signal to the solenoid output 132. The solenoid output 132, in turn, is connected to and sends a signal to the solenoid relay 134. Upon receiving the signal, the solenoid relay 134 connects the power supply 136 to the electric solenoid valve 118 of the pneumatic portion 106.

Once the electric solenoid valve 118 is powered through the solenoid relay 134, the solenoid valve 118 opens and allows air to flow therethrough. As explained above, the electric solenoid valve 118 is disposed between the regulator 120 and the mass air flow meter 116. Thus, when the electric solenoid 118 is opened, the air flow being regulated by the regulator 120 is free to pass through the mass air flow meter 116, through the pneumatic plug 114, and into the cylinder via the spark plug opening 58.

The mass air flow meter 116 senses the air flow and outputs a voltage signal to the controller 108 that is proportional to the air flow to permit the controller 108 to monitor the air flow. The voltage signal is provided to the voltage input 138, which is connected to the voltage monitor 140. As the voltage output by the mass air flow meter 116 is proportional to the air flowing therethrough, variable air flows result in variable voltage output, while stable air flows result in stable voltage output. Accordingly, air flow is determined to be stable when the mass air flow meter 116 outputs a stable voltage to the controller 108. A stable voltage is defined as a condition wherein the detected voltage does not change for a predetermined period of time.

Once a stable air flow is detected, the controller 108 sends a signal to the tightening output 142, which instructs the screwdriver 110 to tighten the tappet screw 50. The screwdriver 110 then begins to rotate so as to tighten the tappet 50 (STEP 404), and thereby rotate the tappet screw 50 to effect a downward linear movement. The tappet screw 50 is tightened until it is determined, based upon monitored air flow, that the engine valve 22 has begun to open.

To detect opening of the engine valve 22, air flow through the cylinder is continually monitored by the mass air flow meter 116 and the controller 108, as described above. By monitoring the air flow, the controller 108 is able to detect whether the engine valve is open (STEP 405). The mass air flow meter 116 outputs a voltage proportional to the air flow to the voltage input 138. When the valve 22 is closed, the detected voltage is stable. During the initial stages of tappet screw 50 tightening in which the engagement end 54 of the tappet screw 50 moves linearly toward the engaged end of the valve stem 27, the engine valve 22 remains closed, and the monitored air flow (and corresponding detected voltage) will remain stable. Once the tappet screw 50 is tightened so as to first engage and then move the engine valve 22, the air flow and, hence, the detected voltage, will change. When the detected voltage changes, the controller 108 recognizes that the engine valve is open.

In response, the controller 108, via the reverse output 144, instructs the screwdriver 110 (STEP 406) to begin loosening the tappet screw 50. Loosening of the tappet screw 50 results in an upward linear movement of the tappet screw 50 and, thus, closing of the engine valve 22.

While the tappet screw 50 is loosened by the screwdriver 110, the controller 108 continues to monitor the air flow so as to determine when the engine valve 22 has closed. As will be appreciated from the foregoing discussion, as the tappet screw 50 is loosened, prior to the engine valve 22 being closed, the engine valve 22 is in a state of closing. During this period, the amount that the engine valve 22 is open is being continually reduced and, therefore, a variable volume of air passes through the cylinder, causing the voltage monitor 140 to detect a variable voltage. When the engine valve 22 is closed, the air flow and associated voltage becomes stable, and the controller 108 will determine that the engine valve is closed (STEP 407).

Upon stabilization of the detected voltage, the controller 108 will output a signal, via the reference output 146, to the screwdriver 110 to stop loosening the tappet screw 50 (STEP 408). It should be noted that at this point in the process, the tappet screw 50 is positioned so that the engine valve 22 has just closed. In this position, the engagement end 54 of the tappet screw 50 is abutting the engaged end of the valve stem 27, but is not applying enough force to overcome the spring bias of the valve assembly. This tappet screw 50 position is referred to herein as the reference position.

When the tappet is in the reference position, the reference output 146 sends the signal to the screwdriver to stop loosening and to begin the final rotation from the reference position, the controller 108 signals to the solenoid output 132 to switch the solenoid relay 134 away from providing power to the electric solenoid valve 118. This causes the solenoid relay 134 to switch from powering the electric solenoid valve 118, thereby de-energizing the electric solenoid valve 118. As the solenoid valve 118 is de-energized, the solenoid valve 118 returns to a state of blocking the air flow between the regulator 120 and the mass air flow meter 116. Consequently, the air valve is turned off (STEP 409).

Once the tappet screw 50 is in the reference position, as mentioned above, the tappet screw 50 is to be rotated, in a loosening direction, a predetermined number of degrees so as to set the tappet clearance. The predetermined number of degrees the tappet screw 50 is rotated from the reference position is determined experimentally. While the exact number of degrees of rotation from the reference position may vary, generally, the tappet clearance is between about 0.160 mm to 0.240 mm, and the tappet screw 50 (assuming a thread pitch of between about 0.75-1.0 threads/mm) should be rotated between about 80-90 degrees from the reference position.

To affect this final tappet screw 50 rotation, the reference output 146, in addition to instructing the screwdriver 110 to stop, also instructs the screwdriver 110 to rotate the tappet screw 50 the predetermined amount or number of degrees, thereby setting the final tappet clearance position. To ensure that the screwdriver 110 rotates the tappet screw 50 the appropriate amount or number of degrees, the time of energization of the screwdriver 110 is controlled. The screwdriver 110 is energized for the amount of time required to rotate the tappet screw 50 the appropriate amount or number of degrees.

The tappet nut 52 must be tightened without moving the tappet screw 50. To accomplish this, a wrench (not shown) engages the tappet nut 52, and tightens the tappet nut 52 while the screwdriver 110 continues to engage the tappet screw 50 to ensure that the tightening of the tappet nut 52 by the wrench does not move the tappet screw 50.

At this point, the process of setting tappet clearance is complete. The screwdriver portion 104 sends a signal to the controller 108 that the cycle is complete (STEP 410). The controller 108 then signals the shut-down output 148, which resets all inputs and outputs (STEP 411) and triggers a cycle completion relay 152 to switch power to the cycle complete light 150 (STEP 412).

The tappet setting device 102 is then reset and prepared to have the pneumatic portion 106 and the screwdriver portion 104 removed from the engine 100. Following removal of the screwdriver 110 and the pneumatic plug 114 from the engine 100, the tappet setting device 102 is ready for setting another tappet screw 50.

The tappet clearance setting method and device of the present invention offers many advantages over conventional methods of tappet clearance setting. Most importantly, the present device and method is capable of setting tappet clearance more accurately than conventional methods and devices. Further, the present invention also yields efficiency improvements, as the microprocessor based controller 108 can receive signals and give instructions much more efficiently than a human operator.

While the present invention has been described with particularity herein, it is considered apparent that the present invention is capable of numerous modifications, substitutions, and rearrangements of parts without departing from the scope and spirit of the present invention. Therefore, the invention is not to be limited to the particular preferred embodiments described hereinbefore, but rather only defined by the claims appended hereto.

What is claimed is:

1. A handheld apparatus for setting a tappet screw at a predetermined clearance from an associated engine valve, comprising:

a screwdriver portion;

a pneumatic portion; and a controller electrically connected to the screwdriver portion and the pneumatic portion, wherein the screwdriver portion is adapted to engage the tappet screw so as to rotate the tappet screw and the pneumatic portion is adapted to direct an air flow through a cylinder associated with the valve, and wherein the controller monitors the air flow through the cylinder and controls the screwdriver to initially move the tappet screw to the predetermined clearance based on the monitored air flow, and wherein the pneumatic portion further comprises:

a regulator, in fluid communication with a main air supply, an electric solenoid valve, electrically connected to the controller, a mass air flow meter, a pneumatic plug, in fluid communication with the mass air flow meter and adapted for insertion into a spark plug hole of the cylinder, and wherein the electric solenoid valve is disposed between the regulator and the pneumatic plug, and is controllably opened and closed by the controller to selectively permit a regulated air flow from the regulator to the cylinder via the plug.

2. The handheld tappet setting apparatus according to claim 1, wherein the mass air flow meter is disposed between the electric solenoid valve and the pneumatic plug, said mass air flow meter sensing air flow and outputting a voltage signal proportional to the sensed air flow, and wherein the controller receives the voltage signal and monitors the voltage signal to determine characteristics of the air flow and conditions of the valve.

3. The handheld tappet setting apparatus according to claim 2, wherein the controller further comprises a first, second, third, and fourth output electrically connected to the voltage input and to the screwdriver portion, wherein the first output receives a signal from the voltage input indicating that the air flow has stabilized and instructs the screwdriver to rotate the tappet until an associated engine valve is opened, the second output receives a signal from the voltage input indicating that the air flow has stabilized and instructs the screwdriver to rotate the tappet until the associated engine valve is closed, and the third output receives a signal from the voltage input indicating a change in the air flow and instructs the screwdriver to turn the tappet a predetermined number of degrees.

4. A handheld tappet screw position setting apparatus for setting a threaded tappet screw at a predetermined position relative to an associated engine valve, comprising:

a screwdriver portion adapted to engage and rotate the tappet screw;

a pneumatic portion adapted to direct an air flow through a cylinder in communication with the associated engine valve; and a controller electrically connected to the screwdriver portion and the pneumatic portion, the controller configured to control the pneumatic portion to direct the air flow through the cylinder, to monitor air flow directed through the cylinder by the pneumatic portion, and to control the screwdriver portion to rotate the tappet screw so as to set the tappet screw at the predetermined position relative to the associated engine valve based on the monitored air flow, wherein the controller is configured to monitor the air flow through the cylinder to determine whether the air flow is stable or unstable, with stable air flow through the cylinder while the controller is controlling the screwdriver portion to rotate the tappet screw indicating that the associated engine valve is in a closed position and unstable air flow through the cylinder while the controller is controlling the screwdriver portion to rotate the tappet screw indicating that the associated engine valve is in an opened position.

5. The handheld tappet screw position setting apparatus according to claim 4, wherein the controller is configured to sequentially: control the screwdriver portion to rotate the tappet screw in a tightening direction so as to move the tappet screw toward the associated engine valve while the air flow is stable; determine a change in the monitored air flow from stable to unstable as the tappet screw is being rotated by the screwdriver portion in the tightening direction once the associated engine valve is moved to the opened position by the tappet screw; and control the screwdriver portion to rotate the tappet screw in a loosening direction so as to move the tappet screw away from the associated engine valve while the air flow is unstable.

6. The handheld tappet screw position setting apparatus according to claim 5, wherein immediately after controlling the pneumatic portion to commence directing air flow through the cylinder, the controller is configured to control the screwdriver portion to rotate the tappet screw in a loosening direction such that the tappet screw moves away from the associated engine valve until the monitored air flow is determined to be stable.

7. The handheld tappet screw position setting apparatus according to claim 5, wherein the controller is configured to control the screwdriver portion to stop rotating the tappet screw in the loosening direction immediately upon determining that the air flow has changed from unstable to stable, and to hold the tappet screw at the stopped position, said stopped position being a reference position.

8. The handheld tappet screw position setting apparatus according to claim 7, wherein the controller is configured to control the screwdriver portion to rotate the tappet screw a predetermined amount from the reference position to the predetermined position relative to the associated engine valve.

9. The handheld tappet screw position setting apparatus according to claim 4, wherein the controller is configured to control the screwdriver portion to rotate the tappet screw so as to move the tappet screw to a reference position based on the monitored air flow, said reference position being a position at which the tappet screw is maximally tightened while maintaining the associated engine valve in the closed position.

10. The handheld tappet screw position setting apparatus according to claim 9, wherein the controller is configured to control the screwdriver portion to rotate the tappet screw a predetermined amount from the reference position to the predetermined position relative to the associated engine valve.

11. A handheld tappet screw position setting apparatus for setting a threaded tappet screw at a predetermined position relative to an associated engine valve, comprising:

a screwdriver portion adapted to engage and rotate the tappet screw;

a pneumatic portion adapted to direct an air flow through a cylinder in communication with the associated engine valve; and a controller electrically connected to the screwdriver portion and the pneumatic portion, the controller configured to control the pneumatic portion to direct the air flow through the cylinder, to monitor air flow directed through the cylinder by the pneumatic portion, and to control the screwdriver portion to rotate the tappet screw so as to set the tappet screw at the predetermined position relative to the associated engine valve based on the monitored air flow, wherein the pneumatic portion includes a mass air flow meter connected to the controller and configured to measure an amount of air flow passing through the cylinder and to output a voltage signal proportional to the measured amount of air flow passing through the cylinder to the controller, and the controller is configured to monitor the air flow directed through the cylinder based on the voltage signal received from the mass air flow meter.

12. The handheld tappet screw position setting apparatus according to claim 11, wherein the controller is configured to monitor the voltage signal received from the mass air flow meter to determine whether the air flow directed through the cylinder by the pneumatic portion is stable or unstable, stable air flow being indicated by a stable voltage signal and unstable air flow being indicated by a variable voltage.

13. The handheld tappet screw position setting apparatus according to claim 12, wherein the controller is configured to control the screwdriver portion to rotate the tappet screw so as to move the tappet screw to a reference position based on the voltage signal received from the mass air flow meter, said reference position being a position at which the tappet screw is maximally tightened while the voltage signal is stable.

14. The handheld tappet screw position setting apparatus according to claim 13, wherein the controller is configured to control the screwdriver portion to rotate the tappet screw a predetermined amount from the reference position to the predetermined position relative to the associated engine valve.

* * * * *